United States Patent
Bryson et al.

[11] Patent Number: 5,455,054
[45] Date of Patent: Oct. 3, 1995

[54] EGG PASTEURIZATION

[75] Inventors: Janice L. Bryson, Bridgewater; Lisa Chedid, Monmouth Junction; Jean M. Michaels, Cranford; Harold Rapp, Denville; Alexander S. Cascione, Lake Hiawatha, all of N.J.

[73] Assignee: Nabisco, Inc., Parsippany, N.J.

[21] Appl. No.: 279,766

[22] Filed: Jul. 25, 1994

Related U.S. Application Data

[63] Continuation of Ser. No. 922,126, Jul. 29, 1992, abandoned.

[51] Int. Cl.$^6$ ............... A23B 5/005; A23B 5/18; B65D 81/00
[52] U.S. Cl. ............... 426/106; 426/330.1; 426/399; 426/521; 426/614
[58] Field of Search .............. 426/399, 521, 426/614, 319, 370, 330.1, 372, 106

[56] References Cited

U.S. PATENT DOCUMENTS

| | | | |
|---|---|---|---|
| 2,776,214 | 1/1957 | Lloyd et al. | |
| 3,251,697 | 5/1966 | Lineweaver et al. | |
| 3,364,037 | 1/1968 | Mink et al. | |
| 3,615,705 | 10/1971 | Kohl et al. | |
| 3,840,683 | 10/1974 | Strong et al. | 426/177 |
| 3,911,144 | 10/1975 | Strong et al. | 426/588 |
| 3,928,632 | 12/1975 | Glaser et al. | 426/72 |
| 4,808,425 | 2/1989 | Swartzel et al. | 426/614 |
| 4,853,238 | 8/1989 | Huang | 426/241 |
| 4,957,759 | 9/1990 | Swartzel et al. | 426/399 |
| 4,971,827 | 11/1990 | Huang | 426/614 |
| 4,994,291 | 2/1991 | Swartzel et al. | 426/399 |

FOREIGN PATENT DOCUMENTS 344123  11/1989  European Pat. Off. .

OTHER PUBLICATIONS

Food Product Formulary, 1974 vol. 2, Tressler and Sultan pp. 374 and 375.

*Primary Examiner*—Anthony J. Weier

[57] ABSTRACT

The invention enables processing eggs, especially low-cholesterol egg products based principally on egg whites, at high temperatures to provide liquid, pasteurized egg products which exhibit improved stability during refrigerated storage. Liquid egg composition is heated to a temperature (e.g. 60° to 75° C.) and for a time effective to reduce the population of viable organisms with some coagulation of the conalbumin, but without significantly coagulating the ovalbumin. A dispersion of coagulated conalbumin in a liquid matrix is homogenized (average particle size is preferably less than 2 microns) to form a smooth-textured, liquid egg composition. The resulting liquid egg compositions have unique textural and visual characteristics.

6 Claims, 1 Drawing Sheet

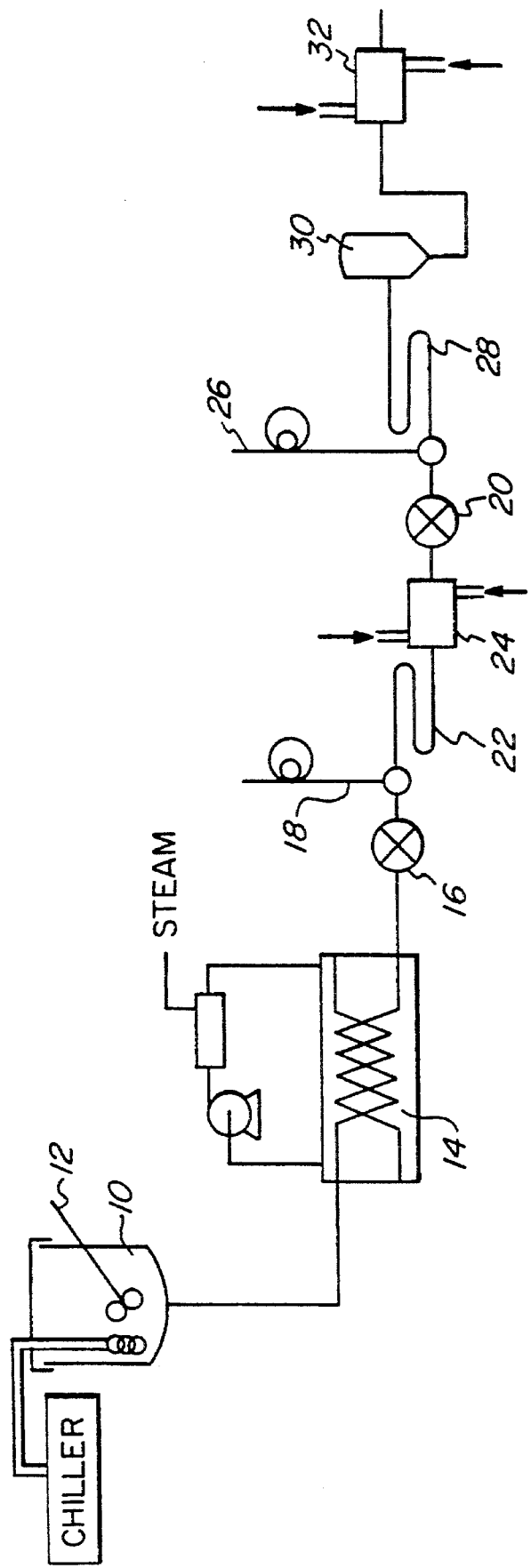

5,455,054

EGG PASTEURIZATION

This is a continuation of application Ser. No. 07/922,126 filed on Jul. 29, 1992, now abandoned.

TECHNICAL FIELD

The invention relates to eggs and, particularly, to the discovery of an improved technique for processing eggs, especially low-cholesterol egg products based principally on egg whites, at high temperatures to provide liquid, pasteurized egg products which exhibit improved microbiological stability during refrigerated storage.

Pasteurization employs the controlled application of heat to reduce the population of microorganisms which affect the safety and preservation of food products, such as eggs. Eggs are particularly susceptible to degradation during heating due to the nature of their protein content. They can easily start to congeal and lose other aspects of functionality. The attainment of a product which is functional and can yet be stored in liquid form has been long sought, especially for low-cholesterol egg products which don't contain significant levels of natural yolk.

To achieve pasteurization sufficient to provide room-temperature-stable or refrigerator-stable eggs on a commercial scale, it is necessary to significantly reduce the counts of Salmonella, Listeria and spoilage-promoting organisms. Unfortunately, it is difficult to control processing to achieve sufficient bacterial destruction without coagulating the egg protein. Current technology has focused on procedures which maintain the greatest possible amount of desired protein functionality. This, however, adds expense and stresses control systems. When the balance is struck too near those conditions which maximize functionality while providing marginal stability, the probability is increased that one or more containers of product will fail to provide long-term stability.

There is a present need for a process which would enable an increased thermal destruction of microorganisms while maintaining the simplest and safest control procedures.

BACKGROUND ART

Egg white is a perishable product, even when stored under refrigeration, due to the growth of spoilage organisms. Most commercial pasteurization processes are intended to decrease the risks posed by pathogenic organisms such as Salmonella bacteria.

The temperatures necessary to achieve eradication of spoilage organisms are not easily, reliably reached without causing protein denaturation. Severe denaturation results in coagulation of the entire product, and this is considered undesirable because consumers prefer liquid, pourable products for convenience in a wide variety of recipes. Accordingly, the most typical commercial products are marketed in the frozen state and permit only one to two weeks stability at refrigerator temperature (4° C). Until recently, refrigerator or room-temperature stable liquid egg products were not available. The present invention has special applicability to products based principally on egg white and provides an improvement over current, state-of-the-art technology.

Egg white, also referred to in the art as egg albumen, is actually a complex mixture of several different types of soluble protein. Significant among these are conalbumin, which is the second most abundant, and ovalbumin, the most abundant. All of the proteins will coagulate and lose their water solubility after heating for well-defined time-temperature combinations. However, not all proteins respond the same, and their responses can be altered by the presence of certain natural and added materials. For example, it is disclosed in European Patent Application 344,123 by Maley et al that whole eggs can withstand temperatures about 20° F. higher than egg white. The onset of coagulation of egg white becomes a problem around 140° F., due principally to the denaturation of the conalbumin.

In one early advance in egg pasteurization, Lineweaver and Cunningham disclosed in U.S. Pat. No. 3,251,697, that the addition of certain polyvalent metal salts enabled increasing the pasteurization temperature several degrees while not adversely affecting the physical properties of the egg. Similarly, in Food Products Formulary, Vol. 2, p.375, by Tressler and Sultan, it is indicated that salts of aluminum and iron can suppress coagulation by forming heat-stable complexes with conalbumin. However, this technique alone does not enable high enough heat treatments to achieve the stability necessary for reasonable periods of refrigerator storage.

With the addition of metal salts to formulations based essentially on egg white in U.S. Pat. Nos. 3,840,683 and 3,911,144, Strong and Redfern pasteurized at about 136° F. for five minutes. These patents disclosed substantially cholesterol and egg yolk-free frozen egg products which had good freeze-thaw stability. This technology permitted the marketing and wide availability of a health-oriented product highly desired by many egg lovers. When frozen, the products last for extended times. It would be desirable, however, to improve the stability of such products against spoilage when maintained in a refrigerated condition.

Other early disclosures, primarily for frozen and dry egg products, employ hydrogen peroxide to aid in pasteurization. In both U.S. Pat. No. 2,776,214 to Lloyd et al and U.S. Pat. No. 3,364,037 to Mink et al hydrogen peroxide is added to egg prior to heating. The first of these discloses destroying natural catalase by heating egg white prior to adding the peroxide. The second adds an alkali. A later patent to Kohl et al (U.S. Pat. No. 3,615,705) combines these two teachings.

More recently, efforts have been made to produce products which remain stable for extended periods of refrigerated or room-temperature storage. For example, in U.S. Pat. No. 3,928,632, Glaser and Ingerson disclosed an aseptically-packaged, low-cholesterol egg product having an additive emulsion which is separately sterilized and homogenized prior to mixing with an egg component. No details of egg pasteurization are provided, but a lactylate salt is an essential ingredient.

In U.S. Pat. No. 4,971,827, Huang discloses that temperatures high enough to obtain a refrigerator-temperature-stable liquid egg product, can be employed when turbulent flow is achieved during pasteurization. To prepare the liquid egg product for heating, it is first heated to about 120° F. and then homogenized. This is followed by a 2-stage heat process employing turbulent flow and resulting in a product temperature of 162° F. The product is cooled and directly packaged without further homogenization. The example states that minimum denaturation was indicated by the percentage of water-soluble protein in the product.

In U.S. Pat. No. 4,853,238, Huang discloses a process which does not require turbulent flow even though even higher temperatures are employed. According to this latter process, microwave energy is used to heat a liquid egg composition in small diameter polytetraflouroethylene tubes at 185° F. for 0.02 seconds to achieve pasteurization without undue coagulation or fouling of heat exchange surfaces. The heated liquid egg composition is rapidly chilled directly following heating. Again, a minimum functional loss in the finished product is reported and no homogenization following the pasteurization is disclosed. Because there is such a small hold time at the temperature identified as necessary and because microwave heating is often difficult to apply uniformly, rigorous quality control checks will be required to assure proper processing.

Swartzel et al, in U.S. Pat. Nos. 4,808,425, 4,957,759, and 4,994,291, disclose the preparation of shelf-stable whole egg products by high-temperature, short-time ultrapasteurization of liquid whole egg. Consistent with published procedures, they suggest heating under turbulent flow conditions. To improve pasteurization, they disclose the desirability of reducing the protein and fat unit size prior to heating. This is said to reduce any tendency of the product to coagulate. Denaturation is preferably kept as low as possible, but it is suggested that a homogenization step after heating be included for this whole egg product.

DISCLOSURE OF THE INVENTION

It is an object of the invention to provide a process for pasteurizing liquid egg products under conditions which maximize the reduction of viable organisms.

It is another object of the invention to provide a refrigerator-stable packaged egg product having a smooth pourable texture.

It is another object of the invention to improve the processing of liquid egg products which are essentially free of fat and cholesterol.

It is yet another object of the invention to improve current egg processing to provide an improved packaged egg product.

These and other objects are accomplished according to the invention which provides an improved process for pasteurizing liquid egg formulations and improved packaged, pasteurized liquid egg formulations.

According to the process aspect of the invention, an improvement is provided in the preparation of a packaged, pasteurized liquid egg product by heating a liquid egg composition to a pasteurization temperature and holding the composition at that temperature for a time period effective to reduce the population of viable microorganisms, cooling the pasteurized egg composition, and packaging the egg composition in a sealed container, the improvement comprising: heating the liquid egg composition at a temperature and time sufficient to provide pasteurization while resulting in some coagulation of conalbumin, but not significant coagulation of ovalbumin. The liquid egg containing coagulated conalbumin is then homogenized to particulate and disperse the coagulated egg composition. Conalbumin coagulation is typically greater than 5% and can be up to 100%.

Hydrogen peroxide and/or a coagulation-suppressing composition can be added to the liquid egg prior to heating. The coagulation-suppressing composition can be selected from the group consisting of polyvalent metal compounds, organosulfur compounds, and mixtures of these.

The product aspect of the invention provides a packaged liquid egg composition prepared according to the above process. Viewed from another perspective, the invention provides a packaged liquid egg composition comprising a dispersion of finely-divided particles of coagulated conalbumin in a liquid egg matrix. The preferred products remain stable at refrigerator temperature for at least 30 days.

BRIEF DESCRIPTION OF THE DRAWINGS

The invention will be better understood and its advantages will become more apparent when the following detailed description is read in conjunction with the accompanying drawing wherein:

The Figure is a flow diagram of a preferred embodiment of the process.

DETAILED DESCRIPTION OF THE INVENTION

The invention will be described in terms of the pasteurization of a liquid, low-cholesterol egg formulation comprised principally of egg white and preferably contains little or no egg yolk. Representative compositions of this type are exemplified in U.S. Pat. Nos. 3,840,683 and 3,911,144 to Strong and Redfern, U.S. Pat. No. 3,928,632 to Glaser and Ingerson, U.S. Pat. No. 4,971,027 to Huang, and European Patent Application 344,123 to Maley et al. The invention is not limited to compositions of this type and can be used with whole egg product formulations as disclosed by Swartzel et al in the U.S. Patents identified above. Each of the above patent disclosures is incorporated by reference in its entirety.

Pasteurization entails heating the liquid egg to a temperature and for a time effective to eliminate pathogenic organisms such as Salmonella and to extend the refrigerated storage life of the product by significantly reducing the number of spoilage microorganisms. The heat treatment necessary to kill the microorganisms is, like that which causes coagulation of protein, a function of both time and temperature. Lower temperatures require longer pasteurization times and higher temperatures permit shorter times. The heat treatment desirably causes at least a "nine log cycle" (9D) reduction in the count of viable Salmonella organisms, i.e., the number is reduced 99.9999999%. Typically, the count of spoilage causing microorganisms is reduced sufficiently to provide at least two weeks storage at refrigerator temperature, i.e. 4° C. Preferred degrees of heat treatment will enable refrigerator storage without spoilage for 30 days to 12 months, most preferably greater than 3 months.

Referring now to the Figure, liquid egg composition is shown held in suitable vessel 10 under agitation by suitable mixing means 12 at a temperature preferably between 1.5° and 5.5° C.

Typically, the low-cholesterol liquid egg compositions of the invention will have liquid egg white as the major component. Preferred low-cholesterol egg compositions comprise at least 95%, e.g., from 97 to 99.5%, egg white. Minor amounts of a variety of other ingredients, include water, vegetable oil, vegetable gums, vitamins, minerals, emulsifiers, stabilizers, and coloring. Metal salts and/or organosulfur compounds can be added to suppress coagulation during heating. Solid particulate foods such as meat, potato, pepper, onion and the like can be packaged with the liquid egg composition.

Preferably, the coagulation-suppressing polyvalent metal compound is a salt of a metal selected from the group consisting of aluminum, iron, copper, nickel, manganese, cobalt, zinc, and cadmium. Most desirably, the metal comprises aluminum. The disclosure of U.S. Pat. No. 3,251,697 to Lineweaver and Cunningham is incorporated herein by reference.

The organosulfur compound is desirably added to the egg in an amount effective to suppress coagulation, thereby permitting pasteurization at higher temperatures and/or for longer times. Typically, the organosulfur compounds will be used at levels of from 0.005 to 0.5 percent of the weight of the egg. Preferred amounts will be in the range of from 0.01 to 0.1 percent. This is disclosed by Rapp in U.S. patent application Ser. No. 07/686,911, filed Apr. 15, 1991, now U.S. Pat. No. 5,096,728.

Small amounts of vegetable oil can be added to help solubilize water-insoluble ingredients. In addition, small amounts of vegetable oil seem to impart certain subtle organoleptic characteristics of real egg (e.g. mouthfeel and texture), but the content typically remains low since it increases the caloric content of the product. Colorants are added to impart a color characteristic of whole egg. Preferred colorants include beta-carotene and/or approved FD & C food colorants (e.g. FD & C yellow #5 and #6).

Gums can be added to provide stablization, viscosity and suitable texture. In addition, they can reduce separation and syneresis. Preferably, gums such as guar gum, xanthan gum, locust bean gum, carrageenan and CMC are used. These can be added individually and in combination at levels of 0.05 to 0.5% by weight.

Prior to pasteurization, the egg composition is desirably tested and adjusted as necessary to achieve a pH typically in the range of 7.5 to 8.5. This can be accomplished with lactic acid or other suitable food acids. If necessary, a suitable alkaline material such as potassium carbonate may be used to adjust pH. Preferably, the egg white will have previously been pasteurized by a process that includes the use of hydrogen peroxide (i.e. Standard Brands and Armour processes, USDA, Egg Pasteurization Manual, ARS 74–78, pp. 19 et seq. and Egg Product Inspectors Handbook, AMS PY-Instruction No. 910, pp. 34 et seq.), which destroys natural catalase present in egg white.

From the vessel 10, the liquid egg is pumped through a suitable heat exchanger 14 such as a scraped surface, high velocity tube-in-shell or noncontacting heating mechanism such as microwaves, electrical resistance or radio frequency to bring the temperature rapidly up within the range of 60° to 75° C., e.g. preferably at least 70° C. At this point or elsewhere before final cooling, the liquid egg composition can be treated with hydrogen peroxide as set forth in commonly assigned, copending U.S. patent application Ser. No. 07/807,306 filed Dec. 13, 1991 in the names of A. Cascione and H. Rapp, now U.S. Pat. No. 5,266,338. For example, the heated egg can be homogenized such as by means 16 (e.g. suitable dairy homogenizer) and the hydrogen peroxide can be injected, such as via line 18, at a location which assures contact temperatures (e.g., at least 58° C.) and times effective to reduce the population of viable organisms as necessary to meet the requirements of the storage conditions.

The heated liquid egg composition can be held, such as in holding tube 22, for a short time effective at that temperature, to achieve the desired reduction in microoganisms. This is followed immediately by cooling, such as in heat exchanger 24, to below coagulation temperature, e.g. below 54° C. The liquid egg composition is then preferably subjected to homogenization by means 20. This can be done in a suitable dairy homogenizer by operating at 500 to 5000 psig.

If desired, catalase or ozone can be added such as by injection downstream via line 26, to eliminate residual peroxide. A holding tube 28 can be provided following catalase injection to allow sufficient time for catalase to break down peroxide. If catalase injection is necessary, the temperature should be effective for its purpose. The composition could then be deaerated by suitable means 30. Final cooling can be provided by a suitable heat exchanger 32 to a temperature preferably less than 4.5° C.

The resulting product has a smooth, homogenous texture. The homogenization by means 20 is preferably sufficient to reduce the size of the coagulated conalbumin particles to less than 2 microns in diameter and produce a dispersion of coagulated conalbumin particles in a liquid matrix. Desirably, at least 96% by weight of the particles should be within the range of from 0.5 to 2.0 microns. This particle size and distribution has the advantage of improving the texture of the product for eating and stability during storage. The dispersed particles also impart a degree of opacity which eliminates the need for including additives for this purpose. The composition has a smooth-pouring viscosity at this point, typically in the range of from about 10 to about 500 centipoises when measured by Brookfield Viscometer (Model RV) at 10 rpm using spindle 1 and a product temperature of 4.5° C. The amount of coagulated conalbumin can act as an indicator of the degree of heat treatment received by the product. The degree of conalbumin denaturation can be determined by DSC (differential scanning calorimetry).

The processed liquid egg is then packaged by feeding it into a heat-sealable package, typically a polymer-coated, fiberboard, gusseted-top container. Other acceptable containers would include cups made of plastics such as polypropylene, other suitable materials or laminates, as well as rectangular packages composed of paper/aluminum foil/polymer laminates. Following filling, the container is sealed. Desirably, filling and sealing will be under aseptic conditions. The filled and sealed containers are then refrigerated. Products prepared and packaged in this manner will preferably be stable against spoilage at refrigerator temperature (4° C.) for at least 2 weeks, preferably at least 30 days, typically from 60 to 180 days. If desired, they can be frozen.

The following example is presented to further illustrate and explain the invention and is not to be taken as limiting in any regard. Unless otherwise indicated, all parts and percentages are based on the weight of the composition at the indicated point in the process.

EXAMPLE

A refrigerator-stable liquid egg product is prepared employing the following formulation and using processing equipment as schematically shown in the Figure.

| INGREDIENT | PARTS |
| --- | --- |
| Egg White | 99.066 |
| Gums | 0.200 |
| Color | 0.070 |
| Vitamins and Minerals | 0.029 |
| Vegetable oil | 0.300 |
| Metal Salt Sol'n | 0.065 |
| Acid | 0.070 |
| Water | 0.200 |

The egg composition is fed from vessel 10 to heat exchanger 14 which raises the temperature of the composition to about 72° C. and held in pasteurization holding tube 22 at that temperature for 0.25 to 6 minutes. Prior to entry into the hold tube, the composition is homogenized at 16 in a suitable dairy homogenizer operated at 500 to 5000 psi, and hydrogen peroxide is added at a level of 30–1500 ppm at line 18 and mixed into the liquid egg by means of an in-line mixer not shown. Following the holding tube 22, the liquid egg composition is cooled to 49° C. in heat exchanger 24.

This is followed by homogenization at 20 in a suitable dairy homogenizer operated at 500–5000 psi to obtain a finished product with the desired smooth, homogeneous and opaque appearance. The product is then cooled in heat exchanger 32 to 4.5° C. or less. The liquid egg composition at this point exhibits a viscosity of 10–500 centipoise as measured by a Brookfield Viscometer (Model RV) at 10 rpm using spindle No. 1 with product at 4.5° C. The process causes selective denaturation, in this case about 70 to 90%, of the conalbumin, but not ovalbumin. In addition, the appearance is opaque due to the suspension and dispersal of the coagulated particles, and this has the advantage of reducing the need for opacifiers (cloud). The composition is then packaged in sealed containers under aseptic conditions. The product is stable at refrigerator temperature (4° C.) for 3 months.

The above description is for the purpose of teaching the skilled worker how to practice the invention and is not intended to detail all of the obvious modifications and variations of it which, while not specifically set forth, are included within the scope of the invention which is defined by the following claims.

We claim:

1. In a process for preparing a packaged, pasteurized liquid egg product by heating a liquid egg composition consisting essentially of egg white having a population of viable organisms and containing conalbumin and ovalbumin, to a pasteurization temperature and holding the composition at that temperature for a time period effective to reduce the population of viable microorganisms, cooling the pasteurized egg composition, and packaging the egg composition in a sealed container, the improvement comprising:

heating the liquid egg composition to an elevated temperature of from about 60° to about 75 ° C.;

subjecting the heated liquid egg composition to a first homogenization and adding hydrogen peroxide to the liquid egg composition to form a homogenized egg composition;

holding the homogenized egg composition at the elevated temperature for a period of time sufficient to pasteurize it, with coagulation of at least 50% of the conalbumin, without significantly coagulating the ovalbumin, to form a dispersion of coagulated conalbumin in a liquid matrix; then cooling the dispersion; and then homogenizing the dispersion to reduce the size of coagulated particles to an average particle size of less than 2 microns to form a smooth-textured, opaque liquid egg composition;

to thereby obtain a liquid egg composition which is stable at refrigerator temperatures for at least 30 days.

2. A process according to claim 1 wherein hydrogen peroxide is added prior to the cooling step.

3. A process according to claim 1 wherein the pH of the liquid egg is adjusted to within the range of from 7.5 to 8.5 and a coagulation-suppressing composition is added to the liquid egg prior to heating, said coagulation-suppressing composition being selected from the group consisting of polyvalent metal compounds, organosulfur compounds, and mixtures thereof.

4. A packaged liquid egg composition prepared according to the process of claim 3.

5. A packaged low-cholesterol, opaque, smooth-textured liquid egg composition comprising at least 95% egg white containing conalbumin and ovalbumin, comprising at least 50% of the conalbumin coagulated and particulated as a dispersion of finely-divided particles of an average particle size of less than 2 microns in a liquid matrix wherein said ovalbumin is not significantly coagulated.

6. A packaged, liquid egg composition according to claim 5 which is stable at refrigerator temperatures for at least 30 days.

* * * * *